(12) United States Patent
Armbruster

(10) Patent No.: US 8,672,668 B2
(45) Date of Patent: Mar. 18, 2014

(54) DEVICE FOR PRODUCING CLOSURES

(75) Inventor: Rainer Armbruster, Wolfach (DE)

(73) Assignee: Foboha GmbH Formenbau, Haslach (DE)

( * ) Notice: Subject to any disclaimer, the term of this patent is extended or adjusted under 35 U.S.C. 154(b) by 61 days.

(21) Appl. No.: 13/319,210

(22) PCT Filed: May 5, 2010

(86) PCT No.: PCT/EP2010/056082
§ 371 (c)(1),
(2), (4) Date: Dec. 12, 2011

(87) PCT Pub. No.: WO2010/128072
PCT Pub. Date: Nov. 11, 2010

(65) Prior Publication Data
US 2012/0088000 A1    Apr. 12, 2012

(30) Foreign Application Priority Data

May 7, 2009   (CH) .......................................... 718/09
Dec. 2, 2009  (CH) .......................................... 1855/09

(51) Int. Cl.
*B29C 45/20* (2006.01)

(52) U.S. Cl.
USPC .......................................... 425/556; 425/572

(58) Field of Classification Search
USPC .................. 425/556, 574, 575, 576
See application file for complete search history.

(56) References Cited

U.S. PATENT DOCUMENTS

| 4,340,352 A | 7/1982 | Hayberg |
| 4,787,841 A * | 11/1988 | Simon ........................... 425/556 |
| 5,744,082 A | 4/1998 | Bak |
| 6,783,346 B2 * | 8/2004 | Bodmer et al. ............... 425/112 |
| 6,827,571 B2 * | 12/2004 | Herbst ........................... 425/556 |
| 8,215,941 B2 * | 7/2012 | Araujo ..................... 425/192 R |
| 2004/0052891 A1 | 3/2004 | Kalemba et al. |
| 2006/0006578 A1 | 1/2006 | Johnson et al. |
| 2009/0084071 A1 | 4/2009 | Moulin |

FOREIGN PATENT DOCUMENTS

| DE | 19848419 C1 | 1/2000 |
| DE | 102006016200 A1 | 10/2007 |
| EP | 1174242 A2 | 1/2002 |
| EP | 1215031 A1 | 6/2002 |
| EP | 1386712 A1 | 2/2004 |
| WO | WO 99/00238 A1 | 1/1999 |
| WO | WO 02/28622 A1 | 4/2002 |
| WO | WO 03/049917 A1 | 6/2003 |
| WO | WO 2004103676 A2 | 12/2004 |
| WO | WO 2007 082394 A1 | 7/2007 |
| WO | WO 2009 080827 A2 | 7/2009 |

\* cited by examiner

*Primary Examiner* — Tim Heitbrink
(74) *Attorney, Agent, or Firm* — Pauley Petersen & Erickson

(57) ABSTRACT

The invention relates to a device (1) for producing hinged closures out of plastic. The device (1) has a prismatic central block (3) which can be rotated about a rotational axis (2), said block being arranged between a first and a second molding plate (4, 5). The first and the second molding plates (4, 5) are movable in relation to the central block (3) in a first direction, and in a closed position, form a plurality of cavities in the area of a first and a second parting plane. The device has a handling system (14) used to remove and transport the hinged closures onto a capping device (16) in accordance with their layout.

7 Claims, 8 Drawing Sheets

1. Part take-off from the middle bloc (cube)

2. Handling moves backwards

3. Part are deposited on the external closing device

DEVICE FOR PRODUCING CLOSURES

BACKGROUND OF THE INVENTION

1. Field of the Invention

The invention is in the field of devices for producing closures by injection molding, in particular devices for producing and closing hinged closures.

2. Discussion of Related Art

The prior art discloses capping devices for capping hinged closures within an injection mold. Apart from embodiments which only enter from the side after the injection mold has been opened, there are known capping devices which are integrated in the injection mold. These integrated capping devices are recessed into the mold halves and remain in the injection mold when it is closed.

U.S. Pat. No. 4,340,352 from the company Global Precision Inc. was published in 1982 and relates to a capping device which enters from the side. A cap connected to a lower lid part by means of a hinge is raised by means of a pin. Subsequently, a closing arm mounted on a slide enters from the side. Controlled by means of a slotted plate, this closing arm lifts the cap and closes it.

WO0228622A from the company Schoettli AG was published in 2002 and concerns a device which comes into action after the opening of an injection mold with a number of cavities. The lower closure parts are initially only lifted a little out of their cavities while seated on a core. The upper closure parts (lids), connected to the lower closure part by means of a hinge, are thereby completely ejected and freed. For the closing of the lids, a frame is made to enter between the mold parts after the opening of the mold. Arranged on the frame are arms with closing rollers, by means of which the closures can be closed. The device has a comparatively complicated structure.

U.S. Pat. No. 5,744,082A from the company Marland Mold Inc. was published in 1998 and concerns a capping device integrated in an injection mold. A movable part of the cavity is mounted such that it can turn about an axis and, after the mold has been opened, can be rotated by 180° for closing the cap. The device has various disadvantages. On the one hand, it requires complicated mold parting. On the other hand, the closure cannot get out of the way during the closing. For this reason, this device can only be used for closures of certain geometries.

EP1386712 from the company BVA SRL. was published in 2004 and concerns a capping mechanism integrated in an injection mold, integrated by means of camways. The capping mechanism is recessed in an integrated manner in one of the mold planes, on the core side, during the injection molding. After the opening of the mold, a closing rod is intended to be moved under the cap along a slotted link, lift the cap and then close it. It is not clear by what mechanism and how the rod is supposed to be moved.

WO03049917 from Jes Gram describes a device for producing hinged closures from a number of material components. By means of an injection mold with a turning central part, hinged closures are produced in two parting planes. The basic idea is to close these hinged closures before, or at the latest during, the ejection from the device. The document does not disclose anything as to how this can actually be accomplished.

US2009084071A from Moulindustrie SAS shows a capping device which is arranged inside an injection-molding device. It has a number of closing rods, which are driven by means of racks and act on the closures when the injection-molding device is open.

The prior art discloses devices which sort closures ejected from an injection mold, in order then to feed them individually to a capping device. These devices are large and comparatively expensive. The closures are moved along complicated slotted links by vibration and aligned. A disadvantage of this principle is that closures with surfaces of high quality are often scratched. A further disadvantage is that the sorting installations tend to become jammed, which requires intensive, costly care.

SUMMARY OF THE INVENTION

It is an object of the invention to present a device and a method by means of which the production of closures, in particular hinged closures, from a number of components or parts is efficiently possible.

It is a further object of the invention to present a device and a method by means of which very efficient finishing and testing of hinged closures is possible.

The object is achieved by the invention defined in the patent claims.

In one embodiment, the invention concerns an injection-molding device (from now on device) for producing hinged closures from plastic. The device has a prismatic central block, which can turn about an axis of rotation and is arranged between a first and a second mold plate of an injection-molding machine. These plates can be moved in relation to the central block in a first direction. In the closed position of the device, the first and second mold plates form a plurality of cavities in the region of a first and a second parting plane with a first and a second side face, opposite each other, of the central block. As a difference from the devices known from the prior art (for example with an integrated capping device), there is the possibility of arranging the cavities so as to correspond to a layout that is optimized for production. The device also has a handling system, which serves for removing and transferring the hinged closures to a capping device in accordance with their layout. This means that the handling system removes and transfers the closures while retaining their layout. As a difference from closures that are externally capped by a sorting installation, this results in processing that is less damaging and in improved traceability.

In one embodiment of the invention, the central block and the handling system are attached to the same holding device or to holding devices that are operatively connected to each other, so that the handling system is always coordinated with the central block, or moved together with it. Depending on the embodiment, the central block is not displaced in a translatory manner or is arranged such that it can be moved along a linear guide in relation to the first and/or second mold plate. The linear guide may be the tie bars of an injection-molding machine or, for example, a rail system supported on a machine bed of the injection-molding machine. Good results are achieved when the holding device consists of two cross members which are arranged at the bottom and top of the central block and are operatively connected to it by means of turning units, by means of which the central block is coaxially supplied with power and media (for example air, water, oil).

In one embodiment, the handling system is arranged on a stationary holding device which does not move along with the central block, or only to a limited extent. The handling system and the handling device may be designed as separate devices, which are for example arranged laterally alongside the injection-molding device and take off the closures from the central block and/or remove them from a parting plane in a defined position. A corresponding design of the handling system is required for this. The closures may be transferred to the capping device by a multi-axis kinematic chain.

The handling system preferably has first holding means, which are arranged so as to correspond to the layout of the cavities. The first holding means may be, for example, suction cups and/or mechanical grippers.

Good results are achieved with a capping device which has a number of rows of second holding means, which serve for temporarily taking over and holding in accordance with their layout hinged closures supplied by the handling system. In this case, the hinged closures are transferred from the first holding means to the second holding means. The holding means of one row may be fastened to a beam, which can turn about a first axis of rotation, in order that the hinged closures can be moved from a first position (receiving position) into a second position (surrendering position). To increase the efficiency, the beams may have second holding means on a number of sides. This allows open hinged closures to be received on one side and closed hinged closures to be surrendered on the opposite side. If need be, the capping device may have means for testing the leak-tightness of hinged closures. This allows the leak-tightness to be tested directly after the closing. Alternatively or in addition, the capping device may comprise at least one lid rod which can turn about a first axis and serves for closing the hinged closures. If need be, the capping device may have closing pins, which engage behind part of the closures when the beams turn, so that the closures are closed as a result of the turning of the beam. Further movements may be superposed.

In one embodiment, the handling device and the capping device are both fastened to the same frame, which is arranged stationarily alongside the injection-molding device. The handling device is arranged above the capping device and has a gripper plate for removing closures in accordance with their layout.

BRIEF DESCRIPTION OF THE DRAWINGS

The invention is explained in more detail on the basis of the embodiments described in the following figures, in which.

DESCRIPTION OF PREFERRED EMBODIMENTS

Figure 1:
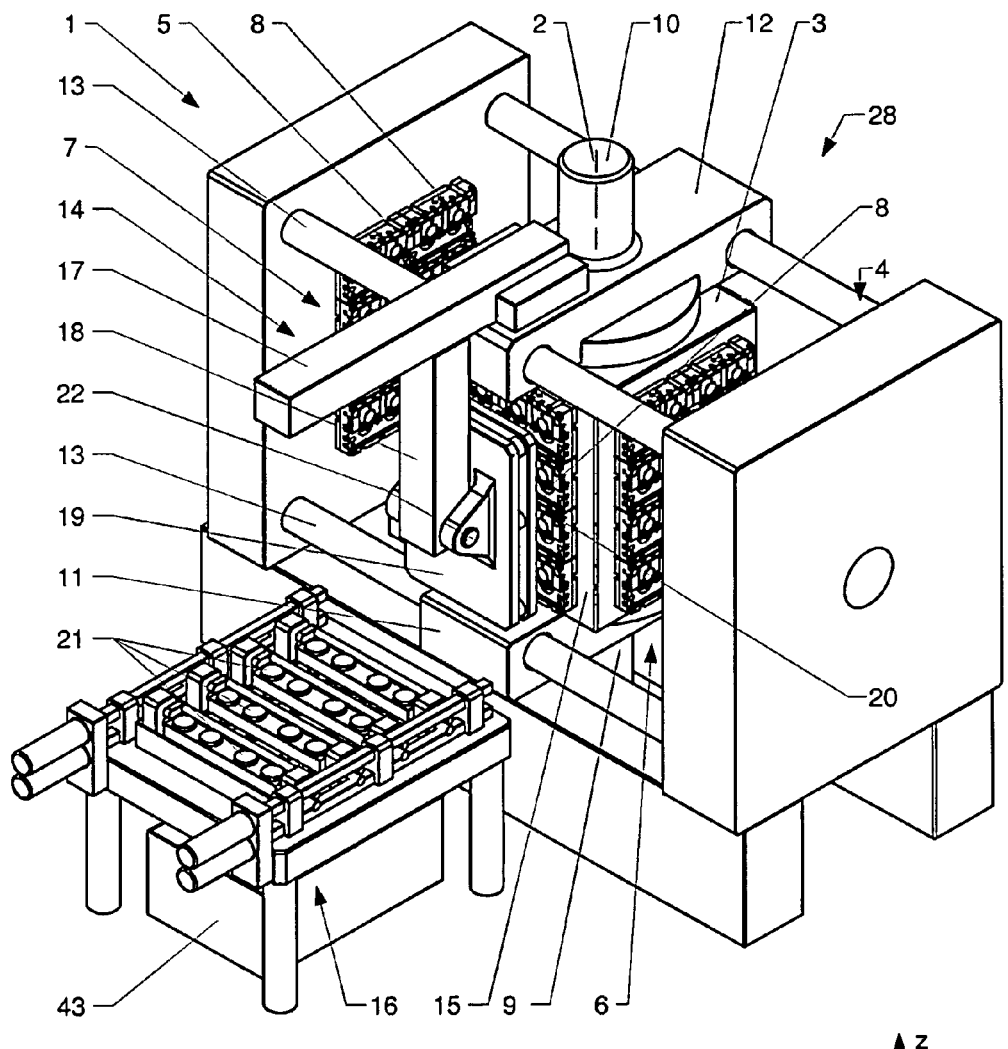
FIG. 1 shows an embodiment of the invention in a perspective representation obliquely from above.

FIG. 1 shows a device 1 according to the invention for producing hinged closures in a perspective representation obliquely from above. The device 1 has a prismatic central block 3, which can turn about an axis of rotation 2 and is arranged between a first and a second mold plate 4, 5. The first and second mold plates can be moved in relation to the central block in a first direction (y direction) and in the closed position form a plurality of cavities 8 in the region of a first and a second parting plane 6, 7.

In the embodiment shown, the central block 3 is guided along the tie bars 13 by means of a lower and an upper turning system 9, 10 on a lower and an upper cross member 11, 12.

The device 1 has a handling system 14, which is fastened here to the upper cross member 12 and serves for removing and transferring the hinged closures in accordance with their layout from a facing mold side 15 of the central block 3 of the capping device 16 arranged here laterally alongside the central block 3.

The handling system 14 has a horizontally arranged cantilever arm 17, on which a downwardly directed gripper arm 18 with a gripper plate 19 fastened in an articulated manner thereto is arranged such that it can be linearly displaced along the cantilever arm 17. The gripper plate 19 is fitted with first grippers 20, which are arranged so as to correspond to the layout of the cavities 8 of the mold side 15.

Once the hinged closures (not represented any more specifically) have been produced in the cavities 8 of the first and second parting planes 6, 7, they are transported into the operating region of the handling system 14 while attached to one mold side 15 of the central block 3 by turning the central block 3 about the axis of rotation 2 after the opening of the device 1. The closures are attached to the mold side 15 of the central block 3, for example, as a result of defined rear-engaging formations, which can easily be released from the mold, or as a result of a negative pressure applied in a controlled manner. After reaching the transfer position, the gripper plate 19 is pivoted inward about a pivot axis 22, until the first grippers 20 are opposite the cavities 8 of the facing mold side 15. Subsequently, the gripper plate 19 is moved in the direction of the mold side 15, until the first grippers 20 take up the closures. With the assistance of an ejecting mechanism arranged in the central block 3, the opened closures are pushed out and taken over by the grippers 20 in a controlled manner. Once the closures have been released from the mold side 15, they are transferred by the handling system 14 directly or indirectly to second grippers 21 of the capping device 16. During this operation, the layout of the closures, i.e. their arrangement corresponding to the mold side 15, is preferably retained. If required, further steps may be included in between, requiring an indirect transfer.

Figure 2:
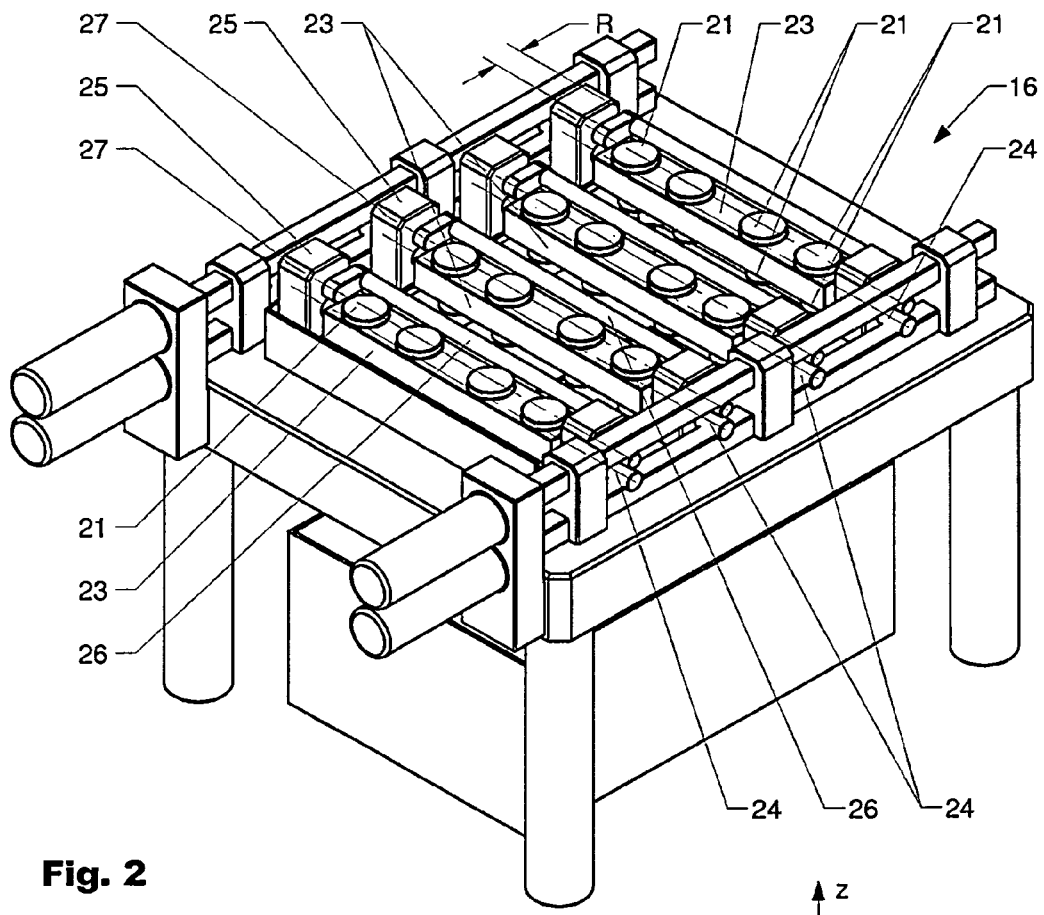
FIG. 2 shows a corresponding capping device in a perspective representation obliquely from above.
Figure 3A:
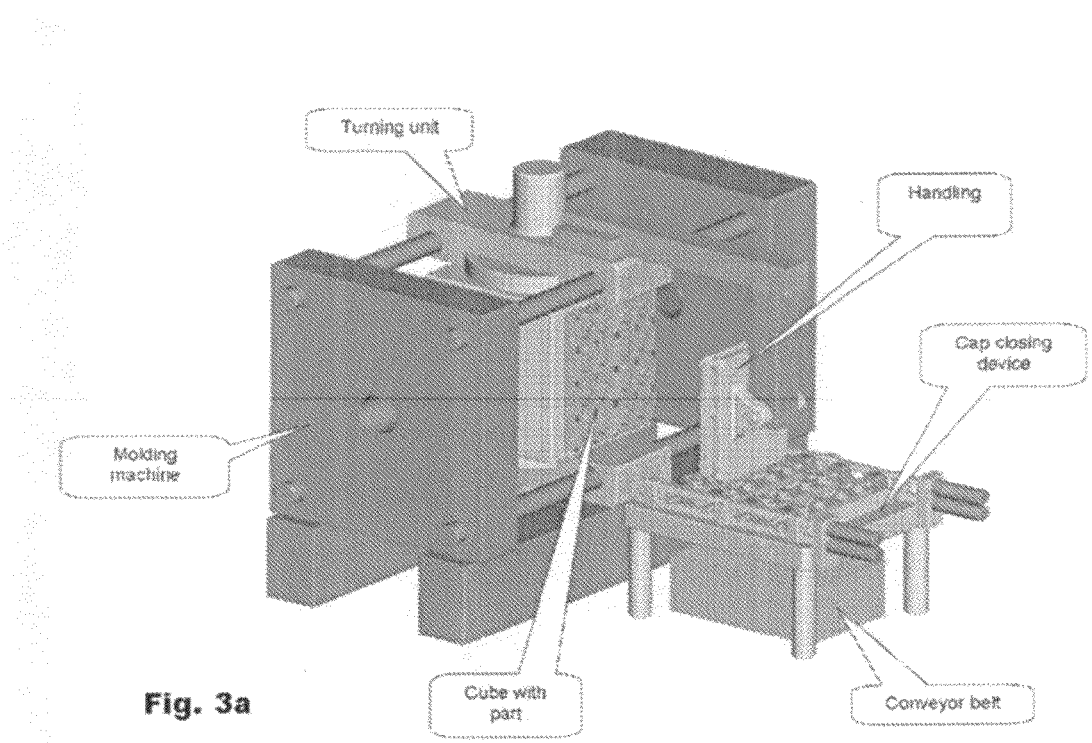
FIG. 3 shows technical documentation of the way in which the device operates.
Figure 3B:
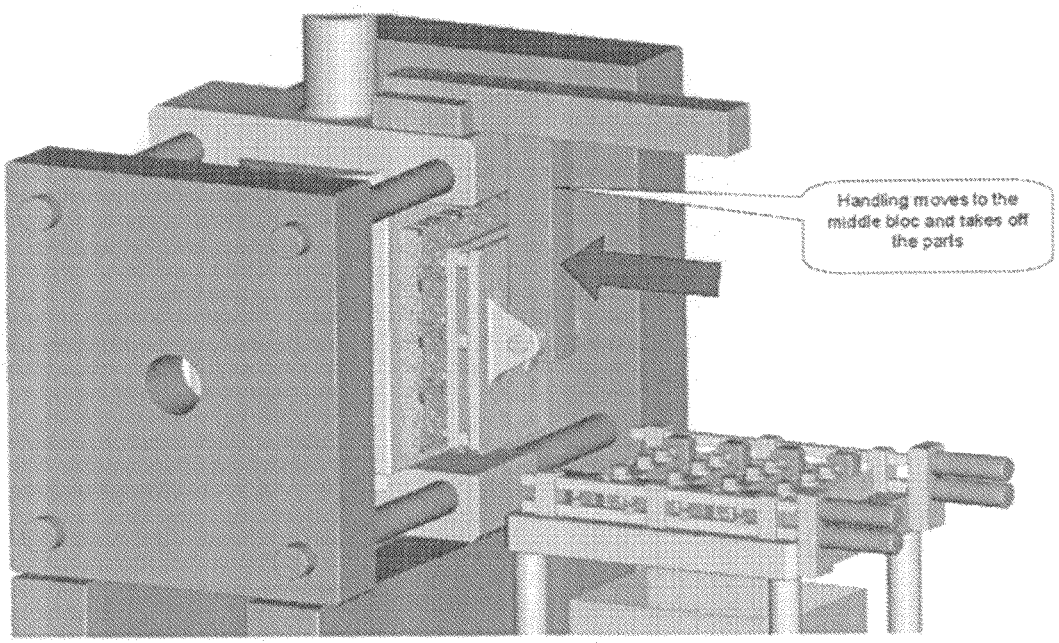
Figure 3C:
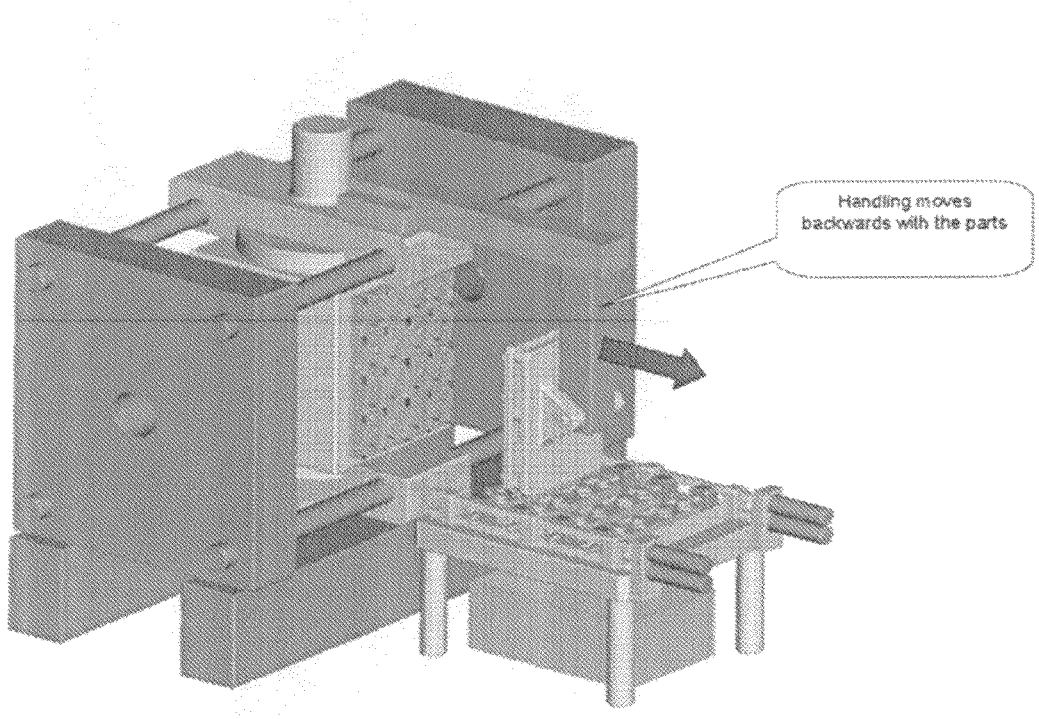
Figure 3D:
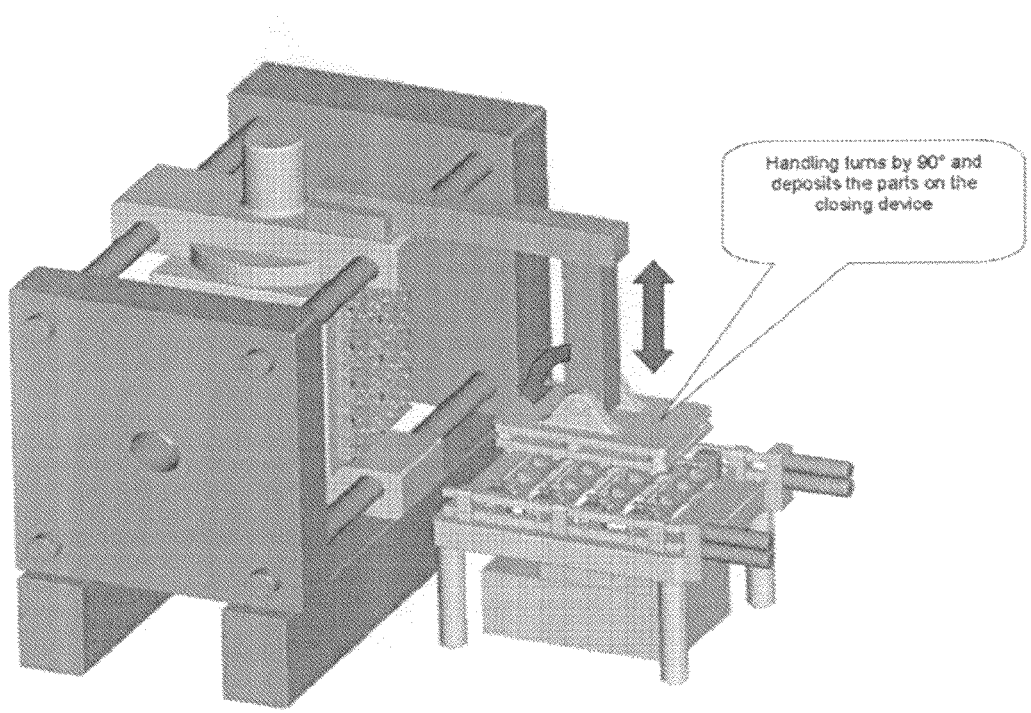
Figure 3E:
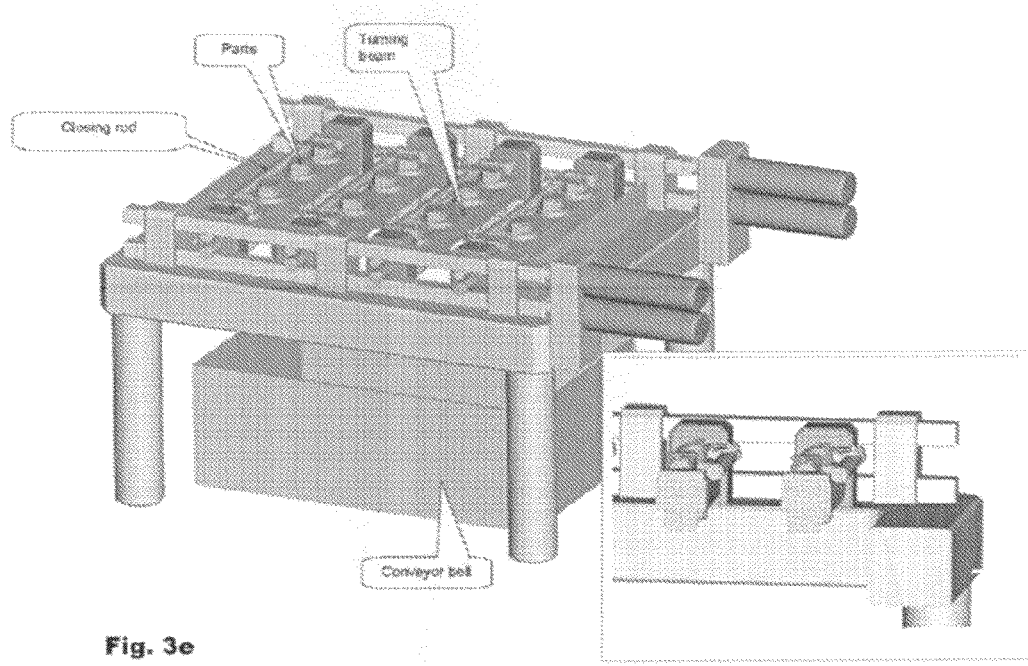
Figure 3F:
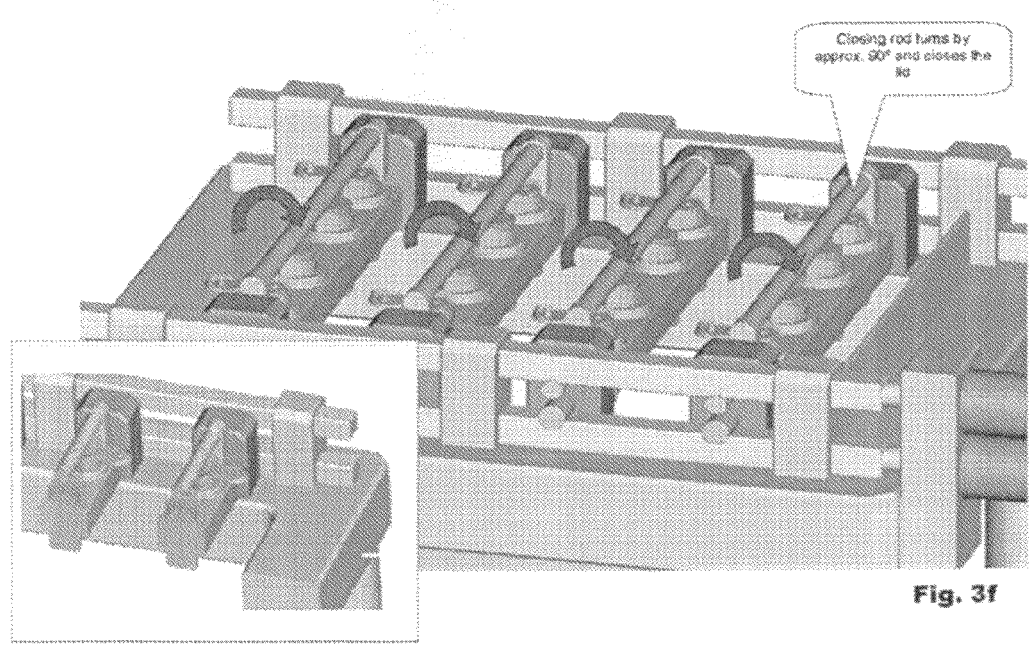
Figure 3G:
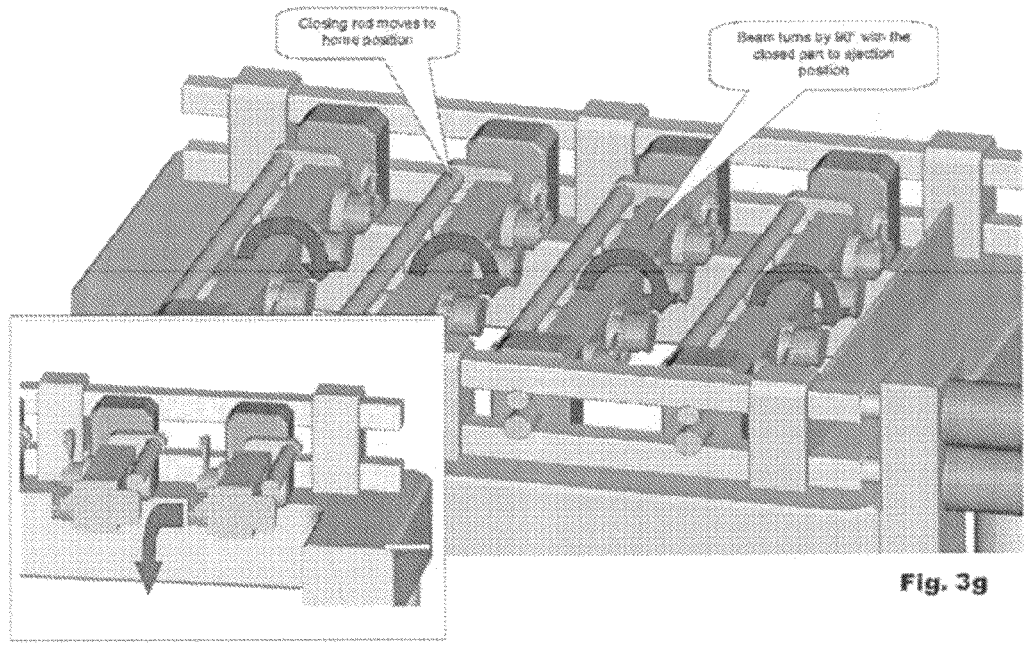
Figure 3H:
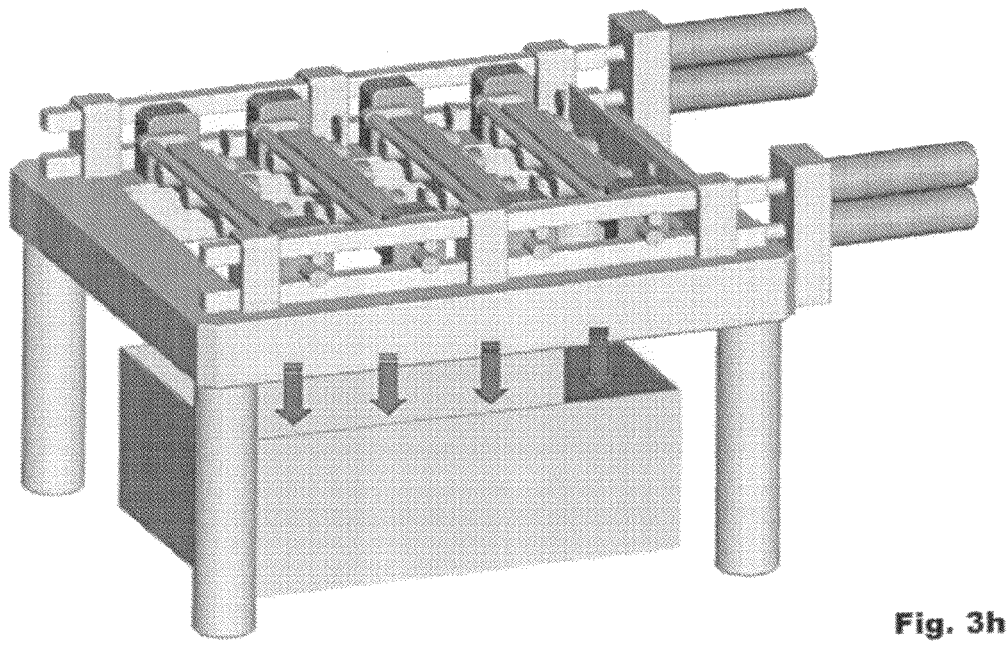

In FIG. 2, the capping device 16 according to FIG. 1 is represented in an enlarged form, detached from the device 1. The capping device 16 has a number of rows of second holding means 21, which serve for temporarily receiving and holding in accordance with their layout hinged closures supplied by the handling system 16. In the embodiment shown, the second holding means 21 of a row are each fastened to a beam 23, which is mounted here in bearing blocks 27 such that it can turn about a first axis of rotation 24. Altogether, four beams 24 can be seen here (a different number is possible). The beams 24 have on two opposite sides second holding means 21 arranged in accordance with the layout.

If need be, the capping device has means for testing the leak-tightness of hinged closures. For example, by applying a controlled negative pressure from the inside by means of the second holding means 21 with the closures closed. If need be, there may be an integrated marking device or label-attaching device (neither represented any more specifically), by means of which the closures can be marked or have a label adhesively attached.

For the actual closing of the closures, the capping device 16 shown has lid rods 26, which are arranged such that they can turn about a second axis of rotation 27 at a distance R from it. The lid rods 26 engage behind the caps to be closed of the closures arranged on the second holding means 21. By turning the lid rods 26 about the second axis of rotation 27, the closures are closed. Alternatively or in addition, the capping device may be equipped with pins which engage behind the closures and close them when the beams 23 turn, as a result of this turning.

Once the closures are closed, they are moved by turning of the beams 23 about the first axes of rotation 24 into the lower region of the capping device 16, where they are thrown into a container 43 or deposited onto a conveyor belt. If need be, a further handling system may also be provided, responsible for example for packing.

In FIGS. 3a to 3h, the way in which a device according to the invention operates is explained once again.

Figure 4:
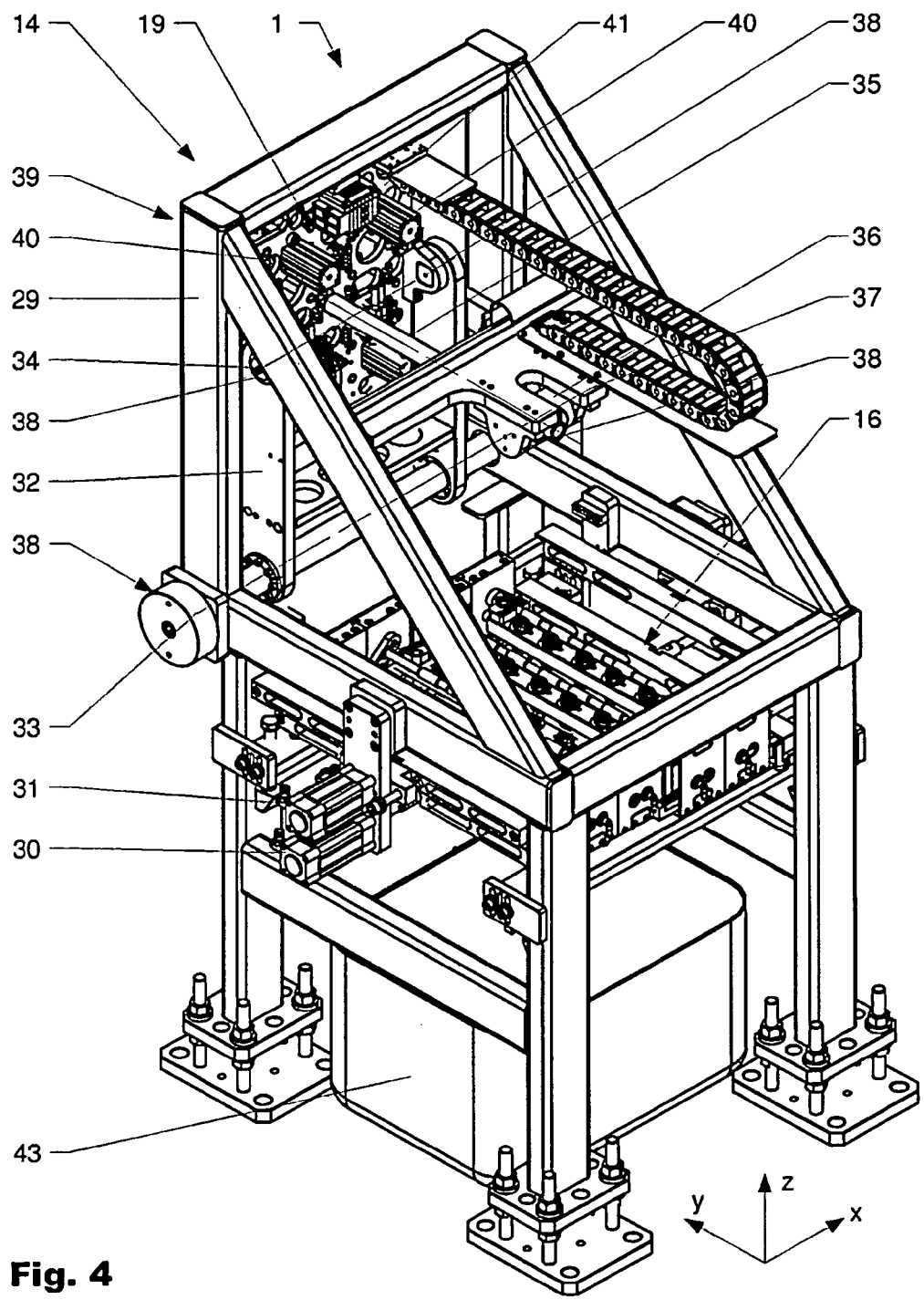
FIG. 4 shows a stationarily arranged removing and capping device.
Figure 5:
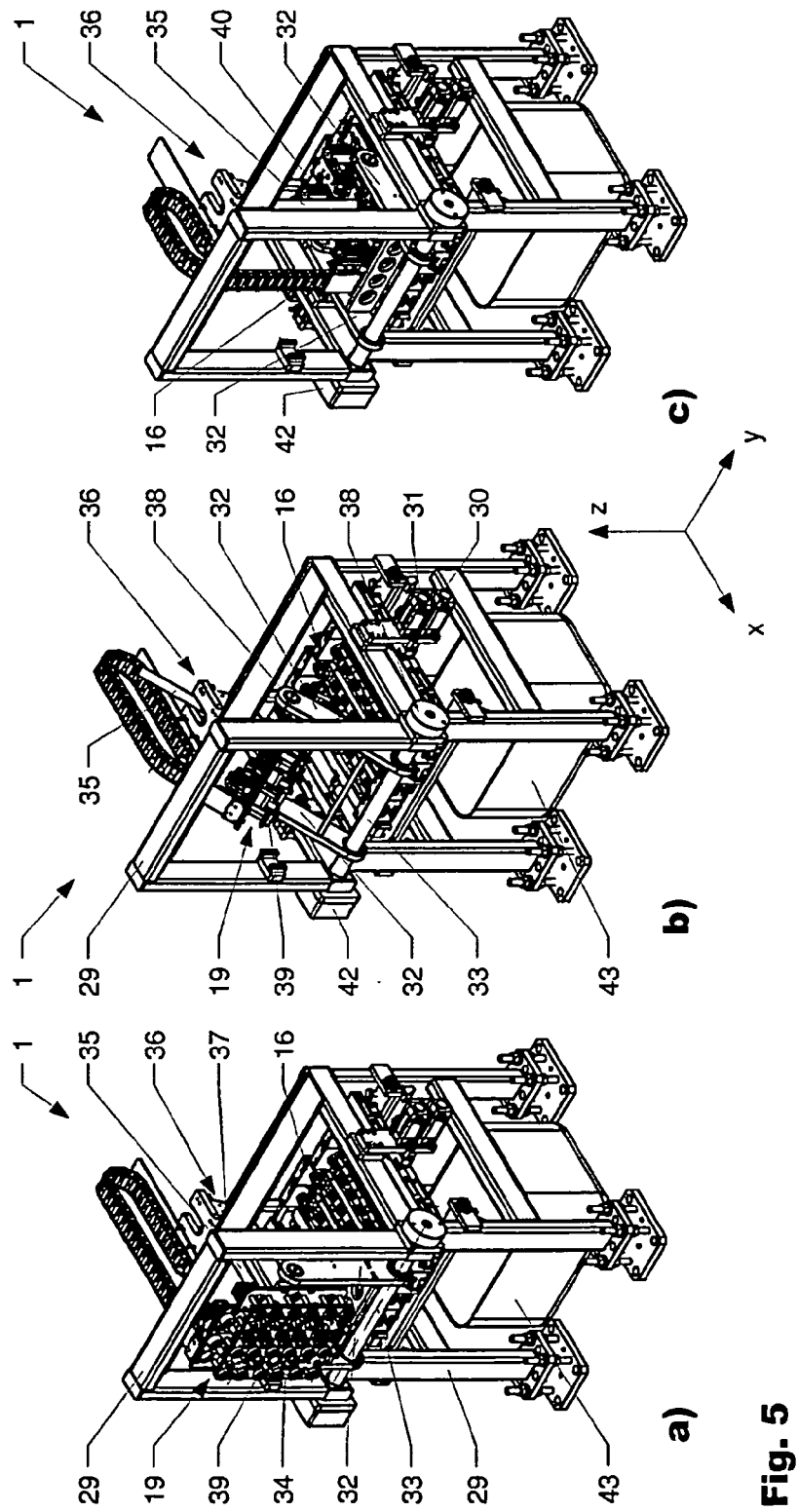
FIG. 5 shows the way in which the removing and capping device according to FIG. 4 operates.

FIG. 4 shows a further embodiment in which a handling device 14 and a capping device 16 are fastened to a frame 29. The way in which it operates is schematically represented in FIG. 5. Here, the actual capping device 16 is fastened to the frame 29 while lying horizontally. Arranged above it is the handling system 14, by means of which closures are removed from an injection-molding device (neither represented any more specifically) and fed to the capping device 16. The capping device 16 is substantially the capping device 16 shown in FIG. 2, so that, with respect to the way in which it operates, reference is made to the corresponding description. A first and a second actuator 30, 31, which serve for driving the capping device 16, can be seen laterally on the frame 29. Depending on the embodiment, these may be electric, pneumatic or hydraulic linear drives or other drives.

A gripper plate 19 is fastened to a pivoting arm 32, which is arranged such that it can pivot about a first pivoting arm axis 33. The gripper plate 19 is arranged such that it can pivot in relation to the articulated lever 32 about a second pivoting arm axis 34. The alignment of the gripper plate 19 is coordinated by a rearwardly protruding guiding rod 35 fastened on the rear side of the gripper plate 19. The pushing rod 35 is mounted in a linear bearing 36, which in turn is fastened on the frame 29 such that it can turn about a third pivoting arm axis 37. In the embodiment shown, the first, second and third pivoting arm axes 33, 34, 37 are arranged parallel to one another. The degrees of rotational freedom required for the pivoting are ensured by radial bearings 38. Other movement sequences can be achieved by other arrangements. The guiding and holding of the cables and supply lines for the gripper plate 19 take place in the embodiment shown by means of a link chain 44.

The movement of the gripper plate 19 is schematically represented in three steps in FIG. 5. In FIG. 5a, the gripper plate 19 is represented in a first, upper vertical end position, in which it is ready for taking over closures or other articles (neither represented any more specifically) from a central block 3 (cf. FIG. 1) or another injection-molding device. For this purpose, the gripper plate 19 has grippers 39, which serve for receiving and holding the closures or other articles and are arranged so as to correspond to the cavities (of the central block). If need be, the grippers 39 may be moved by means of a linear drive 40 (cf. FIG. 4) in relation to a base plate 41 of the gripper plate 19, for example for receiving or surrendering the closures. After receiving the closures by the grippers 39, the pivoting arm 32 is pivoted about the first pivoting arm axis 33 by means of a turning drive 42. As a result of the kinematic relationships defined by the articulations 36, 38, the gripper plate 19 is pivoted downward (cf. FIG. 5b) until it has reached a second, lower horizontal end position (cf. FIG. 5c), in which the closures can be transferred to the capping device 16. Depending on the application area, the gripper plate 19 may also be moved back and forth between the first and second positions by another single- or multi-axis handling device 14, fastened to the frame 29.

Advantages of the device shown are that it has a simple structure, is flexible and requires little space. As a result of the design, the production efficiency is increased, which has positive effects on the production costs. The modular structure allows the device to be produced and installed separately from the injection-molding device. Allowance can be made for extremely different requirements by adapting the sequence of movements. The device 1 shown in FIGS. 4 and 5 for capping hinged closures generally has a separate control and separate driving means, which enable it to operate in an autonomous manner. The separate control allows it to be optimized to the requirements of an injection-molding device to be combined.

International Patent Application PCT/EP2010/056082, filed 5 May 2010, Swiss Patent Reference 00718/09, filed 7 May 2009, and Swiss Patent Reference 01855/09, the priority documents corresponding to this invention, to which a foreign priority benefit is claimed under Title 35, United States Code, Section 119, and its entire teachings are incorporated, by reference, into this specification.

The invention claimed is:

1. A device (1) for producing hinged closures from plastic comprising:
   a prismatic central block (3), which can turn about an axis of rotation (2) and is arranged between a first and a second mold plate (4, 5), which can be moved in relation to the central block (3) in a first direction and, in a closed position of the device, interact with a first and a second side face, opposite each other, of the central block (3) for the purpose of forming a plurality of cavities in the region of a first and a second parting plane (6, 7), arranged so as to correspond to an optimized layout, and
   a capping device (16) arranged laterally alongside the central block (3) and having a number of rows of second holding means (21), which serve for temporarily receiving and holding in accordance with their layout hinged closures supplied by a handling system (14),
   wherein the handling system (14) is arranged laterally alongside the central block (3) and has first holding means (20), which serve for removing and transferring the hinged closures to the second holding means (21) of the capping device (16) in accordance with their layout.

2. The device (1) as claimed in claim 1, wherein the central block (3) is attached to a holding device (17), to which the handling system (14) is also attached.

3. The device (1) as claimed in claim 1, wherein the capping device (16) and the handling system (14) are mounted on a fixed frame (29), which does not move along with the central block (3).

4. The device (1) as claimed in claim 1, wherein the central block (3) is arranged such that it can be moved along a linear guide (13) in relation to the first and/or second mold plate (4, 5).

5. The device (1) as claimed in claim 4, wherein the linear guide comprises tie bars (13) of an injection-molding machine (28) or a rail system supported on a machine bed of the injection-molding machine (28).

6. The device (1) as claimed in claim 1, wherein the handling system (14) includes holding means (39), which are arranged so as to correspond to the layout of the cavities.

7. The device (1) as claimed in claim 6, wherein the holding means are suction cups and/or mechanical grippers (39).

* * * * *